US011189280B2

(12) United States Patent
Kunnath et al.

(10) Patent No.: US 11,189,280 B2
(45) Date of Patent: Nov. 30, 2021

(54) SECURING VOICE ASSISTANT DATA

(71) Applicant: VMware, Inc., Palo Alto, CA (US)

(72) Inventors: Ramanandan Nambannor Kunnath, Bangalore (IN); Ramani Panchapakesan, Bangalore (IN)

(73) Assignee: VMware, Inc., Palo Alto, CA (US)

( * ) Notice: Subject to any disclaimer, the term of this patent is extended or adjusted under 35 U.S.C. 154(b) by 79 days.

(21) Appl. No.: 16/430,899

(22) Filed: Jun. 4, 2019

(65) Prior Publication Data

US 2020/0388276 A1  Dec. 10, 2020

(51) Int. Cl.
*G10L 15/30* (2013.01)
*G10L 15/22* (2006.01)
*H04L 29/06* (2006.01)

(52) U.S. Cl.
CPC .............. *G10L 15/22* (2013.01); *G10L 15/30* (2013.01); *H04L 63/0442* (2013.01); *G10L 2015/225* (2013.01)

(58) Field of Classification Search
USPC .......................... 704/246, 247, 251, 252, 275
See application file for complete search history.

(56) References Cited

U.S. PATENT DOCUMENTS

| | | | |
|---|---|---|---|
| 9,059,971 B2* | 6/2015 | Graham | H04W 12/02 |
| 9,578,026 B1* | 2/2017 | Leopardi | H04L 63/0428 |
| 2011/0222688 A1* | 9/2011 | Graham | H04W 12/0013 |
| | | | 380/247 |
| 2017/0070502 A1* | 3/2017 | Leopardi | H04L 63/061 |
| 2018/0011994 A1* | 1/2018 | Boesen | G06F 21/121 |
| 2020/0105259 A1* | 4/2020 | Lin | H04N 21/6377 |

\* cited by examiner

*Primary Examiner* — Leonard Saint Cyr
(74) *Attorney, Agent, or Firm* — Thomas | Horstemeyer LLP

(57) ABSTRACT

Disclosed are various approaches for encrypting a voice based response to a request through a voice assistant device. The request is associated with a network or federated service. A tunnel speaker containing a private key can decrypt the encrypted response using a private key provided to the tunnel speaker by a client application on a client device.

20 Claims, 7 Drawing Sheets

SECURING VOICE ASSISTANT DATA

BACKGROUND

In an enterprise setting, individuals can utilize a number of different services and applications that are provided by an enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity. However, a voice assistant device may not have the capability to easily authenticate the user with his or her service endpoints. In addition, the assistant might be in a shared environment, such as in a hotel room, an office environment, or other environments in which multiple people might have access to the device. Providing access to the user's services to the assistant can create various issues.

First, authentication of the user can be a process can be performed using application programming interfaces (APIs) created by the provider of the assistant ecosystem to link a user's identity with a particular assistant device. However, in a shared environment, the user might not wish to permanently link his or her identity with the assistant device. Additionally, in a shared environment, the user might not have the proper privileges authentication credentials to access and modify the linked accounts on the assistant device. Additionally, a user might simply be hesitant to perform a cumbersome process of linking his or her service accounts to an assistant device and then later unlinking the accounts from the device when use of the assistant device is completed.

Additionally, text-to-speech data that is provided to the voice assistant device for playback by the device can render the data susceptible to transcription or archiving by the assistant platform in which the voice assistant device is implemented. Therefore, the information security associated with data provided to an assistant can be compromised unless it is otherwise secured or encrypted. However, a third party voice assistant device platform would be unable to playback data in encrypted form without information about how to decrypt the data. But again, providing the voice assistant device with a decryption key would also provide access to the data that is encrypted using the decryption key.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for securing data obtained from services on behalf of a user that are played back using a voice assistant device. A user might have accounts in various services for which access is authenticated using an identity provider service utilized by the user's enterprise. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. For example, a third party conferencing service with which the enterprise provides accounts for its users can authenticate users through an identity provider service.

In an environment in which voice assistant devices are becoming more ubiquitous, providing users access to services provided by the enterprise can be beneficial. Assuming that a user can be authenticated through a voice assistant device, playing back data through the voice assistant device can result in potential leakage of enterprise data. For example, if data is obtained from a user's calendar, email, or other services associated with or provided by the enterprise, playing back portions of the data using a voice assistant device can require potentially sensitive data to be passed through a text-to-speech engine associated with the voice assistant device.

In the case of a voice assistant device that is provided by a third party, instructing the voice assistant device to play back a voice response to a voice request made by a user can result in both the voice request and the voice response to be passed through an application that is controlled by the party providing the voice assistant device. In this scenario, there is a risk that the request or the response can be accessible to the third party providing the voice assistant device. The request or the response can be cataloged or otherwise compromised in this scenario.

Therefore, examples of this disclosure introduce a tunnel speaker that can be paired to a voice assistant device provided by a third party. The tunnel speaker can be paired to the voice assistant device as a Bluetooth peripheral or Bluetooth speaker so that audio played by the voice assistant device is played through the tunnel speaker. Accordingly, voice responses can be encrypted by an assistant connection service on the backend such that they cannot be played or accessed by the voice assistant device, but they are decrypted for playback by the tunnel speaker. The tunnel speaker can also play back unencrypted audio on behalf of the voice assistant device. In this way, the user experience of the voice assistant device is unaffected by use of the tunnel speaker with the exception of audio playback being performed by the tunnel speaker.

Figure 1:
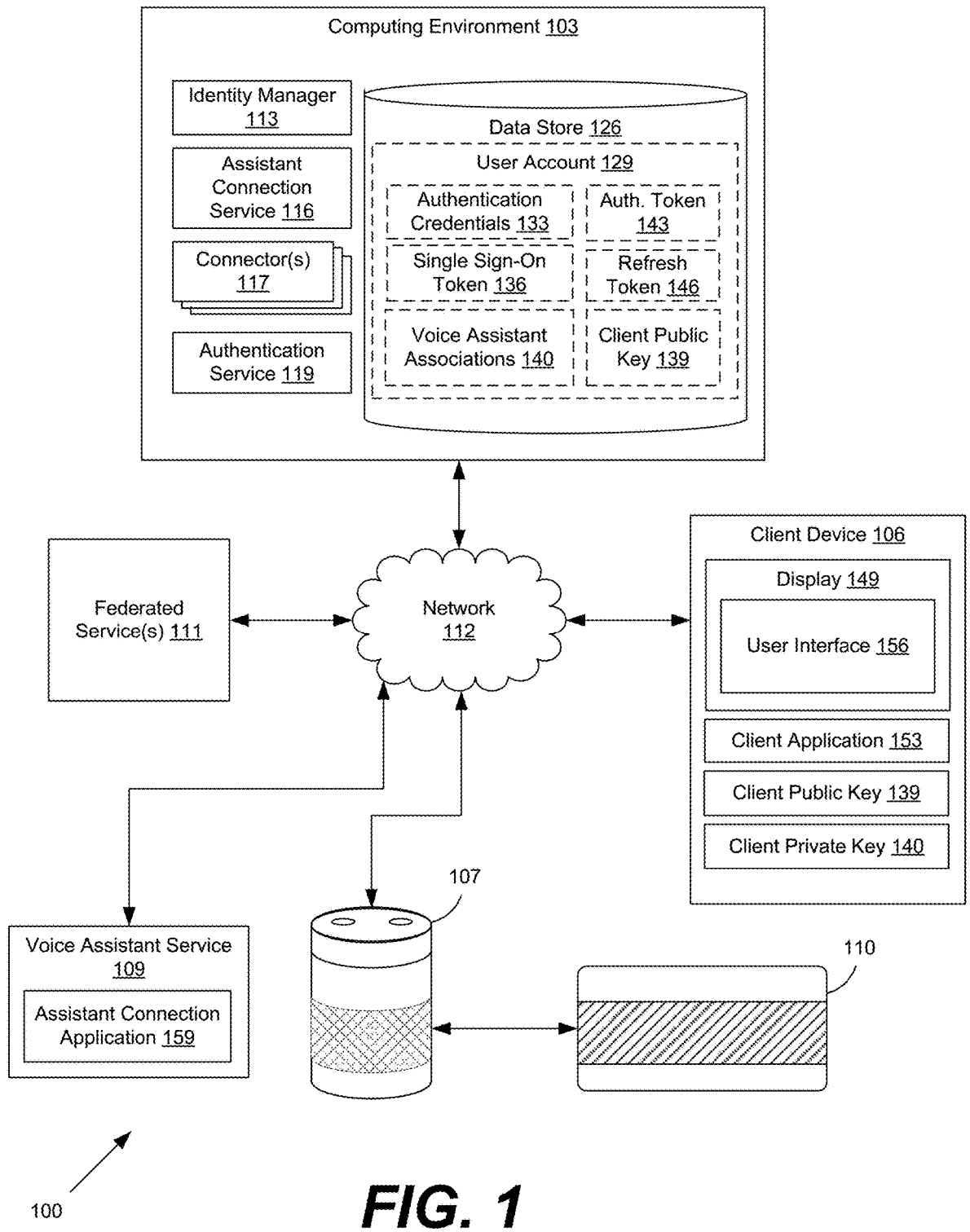
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 107, a voice assistant service 109, and one or more federated services 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

A tunnel speaker 110 can be in communication with the voice assistant device 107 over a Bluetooth connection or another personal area network (PAN) connection. The tunnel speaker 110 can be configured as an audio playback device that is associated with the voice assistant device 107 such that audio playback is performed by the tunnel speaker 110 rather than speakers integrated into the voice assistant device 107. The tunnel speaker 110 can also be connected to the voice assistant device 107 using a wired 3.5 millimeter auxiliary connection, which can cause the voice assistant device 107 to silence its own speakers and output audio over the 3.5 mm audio connection the tunnel speaker. In some implementations, a tunnel speaker 110 can have its own interface for connecting to the network 112. In other cases, the tunnel speaker 110 can be limited to having a Bluetooth interface for communicating with the voice assistant device 107 and client device 106.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed in the computing environment 103 can include an identity manager 113, an assistant connection service 116, one or more connectors 117, and an authentication service 119. In some examples, one or more federated services 111 can also be executed in the computing environment 103 in the case of service endpoints that are provided by the enterprise on the same computing resources of the enterprise. In some embodiments, however, one or more of the federated services 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the federated services 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions to access one or more federated services 111. Examples of identity managers 113 include VMWARE's Identity Manager or MICROSOFT's Active Directory Federation Services.

The authentication service 119 can retrieve and cache authentication data, such as authentication tokens 143 and refresh tokens 146, provided by various federated services 111. The cached authentication data can be used by the contact service 116 to query the federated services 111 for information.

The assistant connection service 116 can facilitate authentication of users who are using an assistant device 107 with the identity manager 113. Additionally, the assistant connection service 116 can enable users to retrieve information from one or more federated services 111 for playback by an assistance device 107 that the user can associate with their user account 129 through the assistant connection service 116. The assistant connection service 116 can have a text-to-speech capability, which can generate voice-based responses to queries or requests received from a voice assistant device 107 on behalf of a user. The assistant connection service 116 can also encrypt the voice-based responses using a respective encryption key associated with the user or a particular tunnel speaker 110.

A connector 117 can provide a standardized mechanism for the assistant connection service 116 to communicate with a federated service 111. Each federated service 111 may provide an application programming interface (API) for communicating, querying, or otherwise interacting with the federated service 111, which can include different methods or functions with different parameters compared to other federated services 111. This can allow for the contact service 116 to send a single, uniformly formatted query to one or more connectors 117. Each connector 117 is then responsible for using the information provided in the query from the contact service 116 to invoke the appropriate functions provided by the API of the federated service 111. To add support for a new federated service 111, a new connector 117 can be created without needing to modify the contact service 116 itself. Likewise, if a change is made to the API of the federated service 111, the connector 117 between the contact service 116 and the federated service can be updated without having to modify the contact service 116 itself.

A federated service 111 can be web application, web service, or other network facing application that can be accessed using a shared identity manager 113. One or more federated services 111 can be provided by the same provider or by different providers.

The user account 129 represents information associated with a user. The information can include one or more authentication credentials 133, one or more single sign-on tokens 136, and/or one or more access permissions applied to the user account, as well as cached authentication tokens 143 and refresh tokens 146. Voice assistant associations 140 can specify one or more voice assistant devices 107 that are associated with a user account 129 and with which a user has authenticated. One a voice assistant association 140 is established by a user, the assistant connection service 116 can provide data from a federated service 111 for playback through the voice assistant device 107 and by the tunnel speaker 110. The voice assistant association 140 can indicate to the assistant connection service 116 that a request coming from a particular voice assistant device 107 is associated with a particular user and that the user has authenticate his or her identity through the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various federated services 111 on behalf of the authenticated user. Additionally, the SSO token 136 can be used by the assistant connection service 116 to access various federated services 111 on behalf of the authenticated user and a voice assistant device 107 associated with the user. In some instances, such as those implementing a version of the KERBEROS protocol, a separate SSO token 136 can be generated for each federated service 111 that the client device 106 attempts to access on behalf of the user. In other instances, the single SSO token 136 can be generated and used to provide the client device 106 with access to several of the federated services 111. Although each of the federated services 111 can have a different set of authentication credentials 133 linked to the user account 129, such as a different user name and password combination, the SSO token 136 allows the user to authenticate once with the identity manager 113 in order to use each of the federated services 111 instead of having to authenticate with each of the federated services 111 separately.

The user account 129 can also store access permissions that identify computing resources that the user account is authorized to access. For example, the access permissions can indicate that a user account is permitted to access some federated services 111 but is prohibited from accessing other federated services 111. As another example, the access permissions can indicate that the user account 129 is allowed to access certain features of a federated service 111, but prohibited from accessing other features. For example, if one of the federated services 111 that a user was permitted to access was a customer relationship management (CRM) service, the user might have permission to access his or her own contacts but be prohibited from accessing the sales contacts of other users.

A client public key 139 represents a public key from an asymmetric key pair that is generated by or on behalf of a user or user account 129. The client public key 139 can be stored with the user account 129 for the purpose of encrypting voice responses that are sent to a voice assistant device 107 for playback through a tunnel speaker 110. The data store 126 need not store a corresponding private key because the assistant connection service 116 does not require the ability to decrypt a voice response that it generates. In some implementations, however, rather than asymmetric key pairs, a symmetric key encryption process can be utilized to encrypt a voice response generated by the assistant connection service 116.

An authentication token 143 is a token provided by one of the federated services 111 in response to a successful authentication with the federated service 111. The authentication token 143 represents that a user account 129 is currently authenticated by the federated service 111 and authorized to access or otherwise interact with the federated service 111 in some capacity. For security purposes, the authentication token 143 often has a time-limit associated with it, such as 1 hour, 3 hours, 6 hours, 8 hours, or some other period of time). Once the time-limit has expired, the authentication token 143 can no longer be used to prove current authentication status of the user account 129 with the federated service 111. The authentication token 143 can be provided, for example, as part of an authentication exchange using a version of the OAUTH protocol.

A refresh token 146 is a token provided by one of the federated services 111 in response to a successful authentication with the federated service 111. The refresh token 146 can be used to acquire a new authentication token 143 once a current or previous authentication token 143 expires. The refresh token 146 often has a much longer time-limit associated with it, such as 1 day, 1 week, 30 days, 3 months, or 1 year, which allows for the refresh token 146 to be used to acquire a series of authentication tokens 143 after an initial successful authentication. In the event that a user's access is revoked, the refresh token 146 can be marked invalid, preventing the refresh token 146 from being used to acquire new authentication tokens 143. The refresh token 146 can be provided, for example, as part of an authentication exchange using a version of the OAUTH protocol.

Each federated service 111 can be associated with a federated user account 131. A user with a user account 129 may also have multiple federated user accounts. For example, a user may have one federated user account for each federated service 111 that the user is registered or enrolled with. As another example, the user may have multiple federated user accounts for a federated service 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such a client application 153. The client application 153 can cause a user interface 156 to be rendered on the display 149. The client application 153 can represent an application that facilitates user authentication with the authentication service 119 and the assistant connection service 116 so that a user can create an association between a voice assistant device 107 and her user account 129. To this end, the client device 106 can include one or more local area network interfaces, microphones, speakers, or cameras that facilitate communication with a voice assistant device 107. Additionally, the client application 153 can allow a user to pair his or her client device 106 and user account 129 with a tunnel speaker 110 so that the tunnel speaker 110 can decrypt encrypted voice responses that are generated by a text-to-speech engine of the assistant connection service 116 and sent to the voice assistant device 107.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107, such as the tunnel speaker 110.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed in order for extended capabilities to be available to every user.

In the context of this disclosure, the assistant connection application 159 can facilitate authentication of a user with the assistant connection service 116 using the voice assistant device 107. Upon authentication, the assistant connection application 159 can retrieve data from the assistant connection service 116 in the form of an encrypted response and cause the encrypted response to be played back through the voice assistant device 107 or tunnel speaker 110. Accordingly, various commands can be implemented in the assistant connection application 159, such as commands to retrieve or make changes to data in a user's calendar, email, or other federated services 111.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

Next, a general description of the operation of the various components of the networked environment 100 is provided. To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

In some embodiments, the authentication service 119 can then authenticate the user with one or more of the federated services 111 in the background or upon the first request for data from a particular federated service 111. For example, the authentication service 119 can send the user's SSO token 136 to each federated service 111 that an access permission 139 indicates a user is authorized to access. In other instances, the authentication service 119 can send the user's SSO token 136 to every federated service 111 that is registered with the identity manager 113. In some embodiments, the SSO token 136 can be included in an authentication request that complies with a version of the OAUTH protocol.

The computing environment 103 can also verify that the user account 129 associated with the SSO token 136 is allowed to access the federated service 111. For example, the authentication service 119 or assistant connection service 116 can query the data store 126 to retrieve a username or other user identifier for the user account 129 associated with the single sign-on token 136. The computing environment 103 can then compare the retrieved username or other user identifier with its own list of registered or authorized users. If the retrieved username or other user identifier matches a username or user identifier stored in the list of registered or authorized users maintained by the federated service 111, then the computing environment 103 can determine that the user account 129 linked to the SSO token 136 is authorized to access the federated service 111. Upon successful authorization, the computing environment 103 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the contact service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the federated service 111. The second authentication request can include the refresh token 146.

In response, the federated service 111 can evaluate the refresh token 146 to determine whether the refresh token 146 is still valid. For example, the federated service 111 could evaluate the refresh token 146 to determine whether it has expired. As another example, the federated service 111 could evaluate the refresh token 146 to determine whether it has been revoked. If the refresh token 146 remains valid, the federated service 111 can then provide the authentication service 119 with a new authentication token 143. By storing authentication tokens 143 in the data store 126, the assistant connection service 116 can utilize the tokens to access data from one or more federated service 111 on behalf of the user.

Accordingly, a user might desire to use a voice assistant device 107 to access data from federated services 111. Accordingly, the functionality associated with the assistant connection application 159 can provide a skill or capability that the user can invoke on the voice assistant device 107. The assistant connection application 159 can communicate with the assistant connection service 116 to make a determination as to whether a user account 129 is associated with a particular voice assistant device 107. Additionally, the assistant connection application 159 and assistant connection service 116 can exchange communications that enable the user to request data from a federated service 111 or any other service for which the user's identity or user account 129 is needed to access.

The assistant connection application 159 can be invoked by the user through a keyword spoken by the user. For example, the user can speak "Assistant, please open enterprise workspace." The keyword "enterprise workspace," or any other keyword, can be associated with the assistant connection application 159 within the assistant ecosystem. When the user invokes the assistant functionality on the voice assistant device 107 and speaks a particular keyword, the assistant connection application 159 can be launched by voice assistant service 109 or the voice assistant device 107.

The assistant connection service 116 can be instrumented to obtain data from particular federated services 111 on behalf of a user. However, the user must first authenticate her user account 129 using the voice assistant device 107 so that the assistant connection service 116 will provide the requested data from a particular federated service 111. Upon authenticating, the user can then access data from federated accounts 111 that are supported by the assistant connection application 159 and the assistant connection service 116. Once authenticated, if the user requests data from her calendar, email, contacts, or other federated services 111, the assistant connection service 116 can obtain the requested data and generate a soundwave or sound file that is encrypted to form an encrypted response that is sent to the voice assistant device 107.

The scenario depicted in FIG. 1 assumes that the tunnel speaker 110 is connected or paired to the voice assistant device 107 so that the voice assistant device 107 plays back audio through to the tunnel speaker 110. The tunnel speaker 110 can be connected to the voice assistant device 107 as a Bluetooth speaker or a wired or wireless peripheral device through which the voice assistant device 107 plays back audio. The voice assistant device 107 can be configured such that all audio playback is performed through the tunnel speaker 110 rather than an integrated speaker system of the voice assistant device 107.

Accordingly, the tunnel speaker 110 and the client application 153 can perform a key exchange process whereby the client application 153 generates or obtains a key pair that is specific to a user account 129. The key pair can also be tied to the tunnel speaker 110 such that another tunnel speaker 110 associated with the user has a separate key pair. An asymmetric key pair can be generated that includes a client public key 139 and a client private key 140. The client public key 139 can be provided to the assistant connection service 116 and used to encrypt voice responses that are generated by the assistant connection service 116. A client private key 140 represents a private key corresponding to the client public key 139. The client private key 140 can be provided by the client application 153 to the tunnel speaker 110 so that the tunnel speaker 110 can decrypt a voice response that is sent by the assistant connection service 116 to the voice assistant device 107. Because the voice assistant device 107 is configured to utilize the tunnel speaker 110 for audio playback, the tunnel speaker 110 can decrypt an encrypted soundwave received by the voice assistant device 107.

Figure 2:
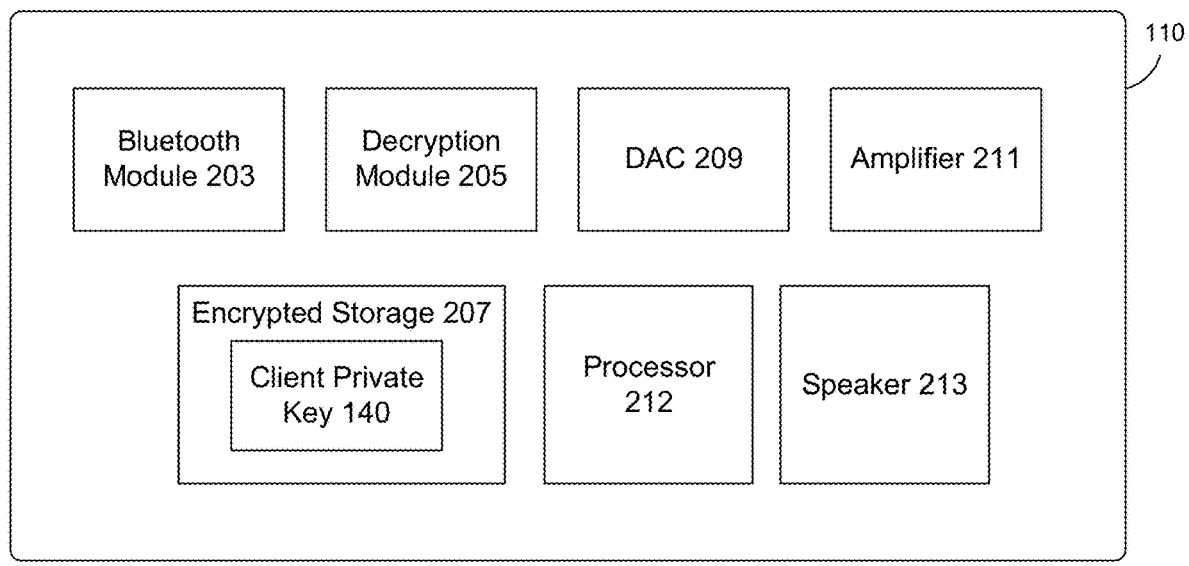
FIG. 2 depicts a scenario according to examples of the disclosure.
Figure 3:
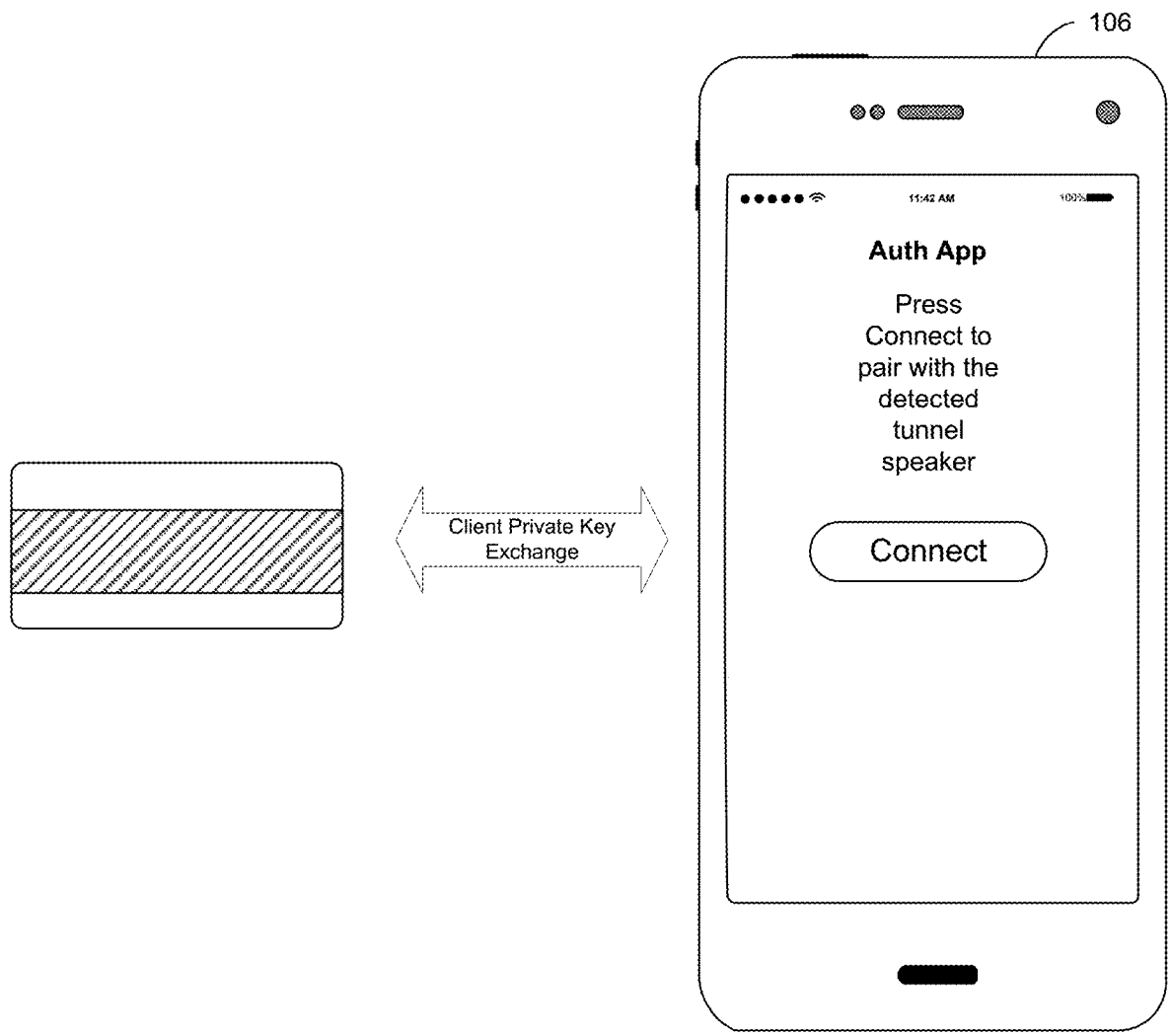
FIG. 3 depicts a scenario according to examples of the disclosure.

Referring next to FIG. 2, shown is a block diagram that represents the various functionality or modules that can be incorporated into a tunnel speaker 110 according to one example. The tunnel speaker 110 can be equipped with a network interface that permits the tunnel speaker 110 to communicate with a voice assistant device 107 and a client device 106. The network interface can include a Bluetooth module 203 that permits device to device communications or pairing. Using the Bluetooth module 203, the tunnel speaker can pair with the voice assistant device 107 and act as a speaker through which audio can be streamed using Bluetooth Audio Streaming.

The tunnel speaker 110 can also include a decryption module 205. The decryption module 205 can comprise a hardware-based or software-implemented decryption component that can decrypt encrypted audio or encrypted soundwaves streamed to the tunnel speaker 110 by a voice assistant device 107. The decryption module 205 can utilize a client private key 140 that is stored in encrypted storage 207 on the tunnel speaker 110. The encrypted storage 207 can be a dedicated storage system or subsystem of the tunnel speaker 110 that is encrypted or otherwise secured. The encrypted storage 207 can also be a secured or encrypted portion of a storage system or mass storage resources of the tunnel speaker 110.

In some implementations, the tunnel speaker 110 can include a digital-to-audio converter (DAC) 209. The DAC 209 can take as an input digital audio and output an analog signal that can be played back by a speaker 213. The tunnel speaker 110 can receive digital audio signals from the voice assistant device 107, perform decryption on an encrypted audio signal, if one is detected, and provide the digital audio signals to the DAC 209, which can output an analog audio signal to an amplifier 211. The amplifier 211 can cause the analog audio signal to be played back by a speaker. In some implementations, the DAC 209 and amplifier 211 can be combined into a single module.

The tunnel speaker 110 can also include at least one processor 212, which can coordinate the key exchange process with a client device 106, the pairing process with a voice assistant device 107, and decryption of an encrypted audio signal or soundwave for playback by the speaker 213. In some implementations, software can be stored in a memory or storage of the tunnel speaker 110 for execution by the processor 212.

Referring next to FIG. 2, shown is a scenario that illustrates how a user can initiate a key exchange or pairing process between the tunnel speaker 110 and the client application 153 executing on a client device 106. The key exchange process can result in the client private key 140 being stored on the tunnel speaker 110 so that the tunnel speaker 140 can decrypt encrypted audio streamed to tunnel speaker 110 by the voice assistant device 107.

In the scenario shown, the user has invoked the functionality in the client application 153 that initiates the key exchange process. The client application 153 can require the user to authenticate with the identity manager 113 so that the client device 106 is associated with the user account 129 of the user. Upon completion of the key exchange process, the client private key 140 is stored in the tunnel speaker 110 and the client public key 139 is accessible to the assistant connection service 116 to that it can use the client public key 139 to generate encrypted voice responses. The key exchange process is described in further detail in the discussion of FIG. 4.

More generally, however, the user can ask the voice assistant device 107 to launch or invoke the assistant connection application 159 by using a keyword linked to the assistant connection application 159 within an assistant ecosystem in which the voice assistant device 107 operates. The user can request that the voice assistant device 107 retrieve data from the user's calendar, email, task list, or another federated service 111 for which access is authenticated by the identity manager 113. Assuming the user has authenticated his identity using the voice assistant device 107 so that a voice assistant association 140 is associated with the user account 129, the assistant connection application 159 can forward a voice-based request made by the user to the assistant connection service 116. The voice-based request can be transcribed to text by the assistant connection application 159 or the assistant connection service 116. The assistant connection service 116 can respond with a voice-based response to the request, which is encrypted using the client public key 139 so that only the tunnel speaker 110 (and not the voice assistant device 107) can decrypt the encrypted response.

In some implementations, the user can also suspend or terminate a pairing between the user account 129 and the voice assistant device 107 using the client application 153. The user can also suspend or terminate a pairing between the user account 129 and the tunnel speaker 110 using the client application 153, which would result in revocation of the client private key 140 previously provided to the tunnel speaker 110. In this scenario, the user can revoke the client private key 140 by invoking a feature in the client application 153 to communicate directly with the tunnel speaker 110 using the Bluetooth or other network interface and instructing the tunnel speaker 110 to delete the client private key 140. The user can also revoke the client private key 140 indirectly by causing the client application 153 to transmit a request to the assistant connection service 116 to cease use of the client public key 139 to generate encrypted voice responses or to delete the client public key 139 so that it is no longer used. Once the client public key 139 is not used to encrypt a voice response generated the assistant connection service 116, the tunnel speaker 110 is unable to decrypt anything using the corresponding client private key 140. Therefore, removing the client public key 139 from use can act as an effective revocation of the client private key 140.

If the user activates a suspend feature within the client application 153, the client application 153 can send an indication to temporarily suspend use of the client private key 140 by the assistant connection service 116 until the user activates a resume button in the client application 153. While the suspension is in effect, the assistant connection application 159 or assistant connection service 116, in response to a request from the voice assistant device 107 or the user for data from a federated service 111, can reply with a response that the requested is unavailable due to the suspension being in effect.

If the user activates a terminate feature within the client application 153, the client application 153 can send an indication to terminate use of the client private key 140. After termination, in response to a subsequent request from the voice assistant device 107 or the user for data from a federated service 111, the assistant connection application 159 or assistant connection service 116 can reply with a response that the user should authenticate before data from a federated service 111 can be retrieved using the voice assistant device 107.

Figure 4:
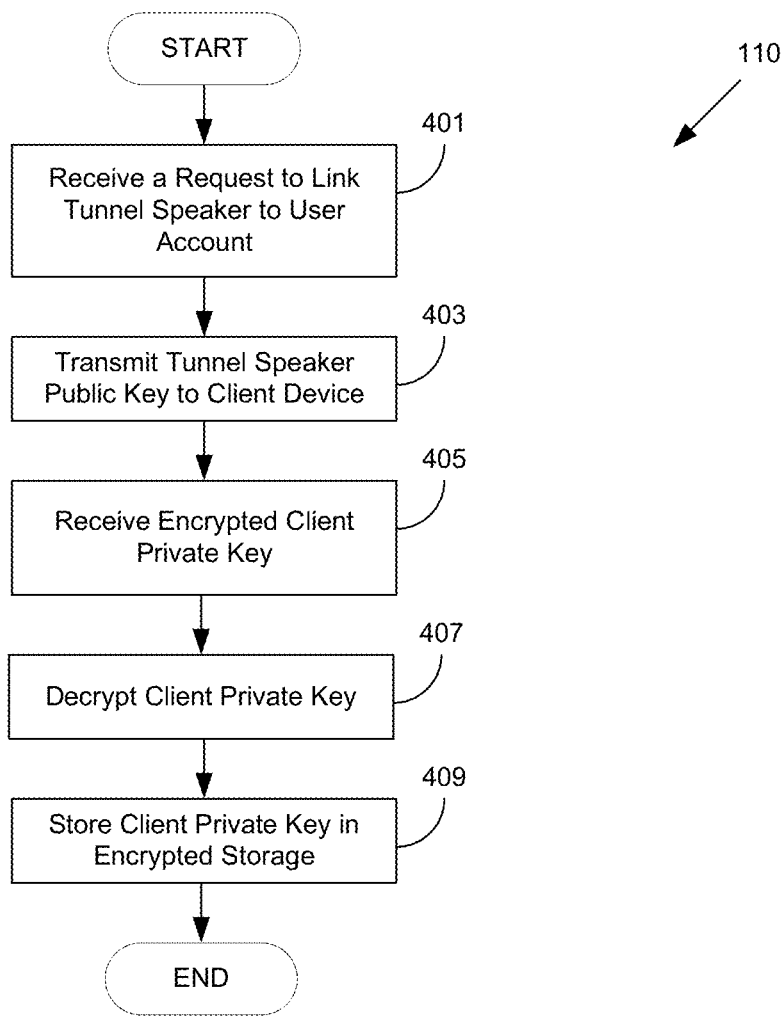
FIG. 4 is a flow chart depicting the operation of an example of a component of the network environment of FIG. 1.

FIG. 4 is a flowchart depicting an example of the operation of a portion of the tunnel speaker 110. It is understood that the flowchart of FIG. 4 provides merely an example of the many different types of functional arrangements that can be employed to implement the portion of the tunnel speaker 110 as described herein. As an alternative, the flowchart of FIG. 4 can be viewed as depicting an example of elements of a method implemented by the tunnel speaker 110 in some implementations.

Beginning at step 401, the tunnel speaker 110 can receive a request to link a user account 129 with the tunnel speaker 110. The request can be received over a network interface such as the Bluetooth interface 201. The request can be considered a request to pair the tunnel speaker 110 with the user account 129 or a client device 106 associated with the user account 129. However, the tunnel speaker 110 is not paired with the client device 106 in the sense that the tunnel speaker 110 acts as a Bluetooth speaker for audio playback from the client device 106 because the tunnel speaker 110 is paired with the voice assistant device 107 for audio playback. Instead, the pairing process performs a key exchange process in which the client application 156 can provide a client private key 140 to the tunnel speaker 110.

At step 403, the tunnel speaker 110 can transmit a tunnel speaker public key to the client application 156. The tunnel speaker public key can represent a public key from an asymmetric key pair that is different from the client public key 139 and client private key 140. A corresponding tunnel private key can be stored within the tunnel speaker 110 and used for the purpose of securing the key exchange between the tunnel speaker 110 and client application 156. The tunnel speaker public key provided by the tunnel speaker 110 to the client application 156 can be used by the client application 156 to encrypt the client private key 140 provided by the client application 156 to the tunnel speaker 110.

At step 405, the tunnel speaker 110 can receive the client private key 140 from the client application 156. The client private key 140 can be encrypted using the tunnel speaker public key provided to the client application 156 at step 403. The client private key 140 can be received over a network interface, such as a Bluetooth interface of the tunnel speaker 110.

At step 407, the tunnel speaker 110 can decrypt the encrypted client private key 140 using the tunnel speaker private key that corresponds to the tunnel speaker public key used to encrypt the client private 140.

At step 409, the tunnel speaker 110 can store the client private key 140 in encrypted storage 207. The client private key 140 can be later utilized by the tunnel speaker 110 to decrypt encrypted audio or soundwaves that are streamed to the tunnel speaker 110 by the voice assistant device 107. The encrypted audio can represent voice responses to voice requests that are made through the voice assistant device 107 and that invoke the assistant connection service 116 because the requests represent requests for potentially sensitive enterprise data. Thereafter, the process proceeds to completion.

Figure 5:
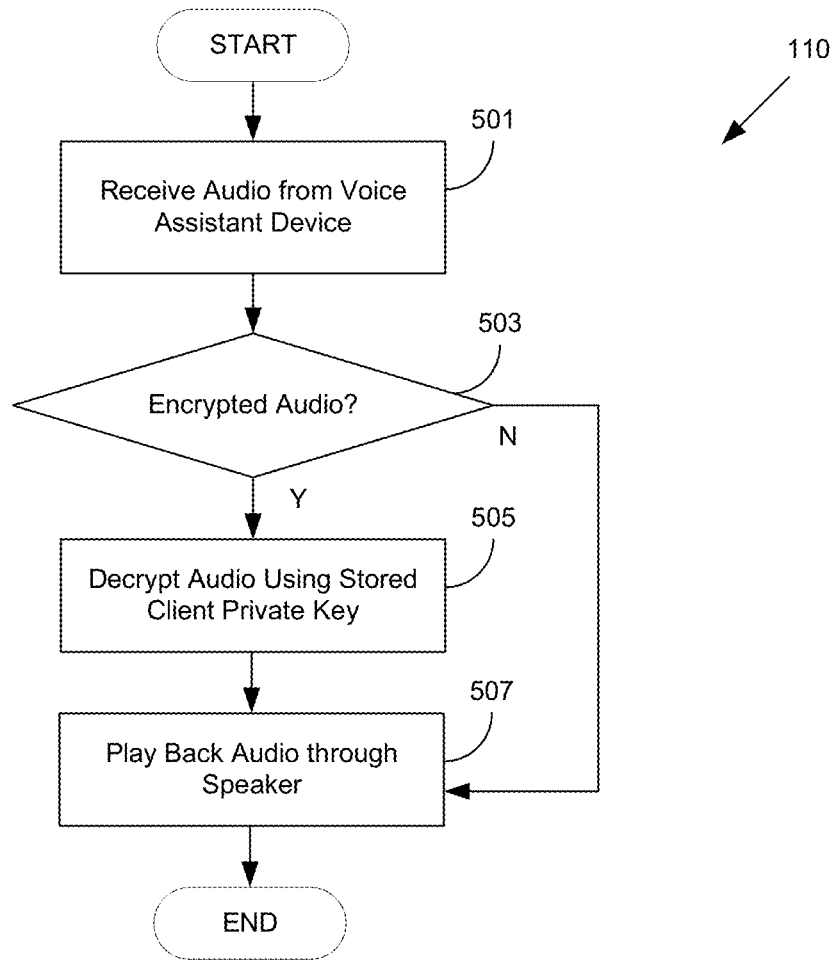
FIG. 5 is a flow chart depicting the operation of an example of a component of the network environment of FIG. 1.

FIG. 5 is another flowchart depicting an example of the operation of a portion of the tunnel speaker 110. It is understood that the flowchart of FIG. 5 provides merely an example of the many different types of functional arrangements that can be employed to implement the portion of the tunnel speaker 110 as described herein. As an alternative, the flowchart of FIG. 5 can be viewed as depicting an example of elements of a method implemented by the assistant connection service 116 in some implementations. The flowchart of FIG. 5 illustrates how the tunnel speaker 110 can decrypt an encrypted audio stream, soundwave, or other encrypted data stream.

Beginning with step 501, the tunnel speaker 110 can receive an audio stream from the voice assistant device 107. As noted above, the tunnel speaker 110 can be connected to the voice assistant device 107 as a Bluetooth peripheral (or using another network interface) such that all audio playback by the voice assistant device 107 is performed through the tunnel speaker. Accordingly, whether the voice assistant device 107 is playing music from a music streaming service, serving up search results, or playing back a voice response to a query made to the assistant connection service 116, the audio that is played back can be streamed to the tunnel speaker 110 rather than using an internal speaker system of the voice assistant device 107.

At step 503, the tunnel speaker 110 can determine whether the audio stream contains an encrypted audio stream or soundwave. The audio stream can be encrypted using steganography so that an audio file or stream that is digitally generated by the assistant connection service 116 is encrypted using the client private key 140. For example, a voice response to a query from a user can be generated and then encrypted using the client private key 140. The resultant encrypted soundwave or audio stream can be sent to the voice assistant device 107, which can provide the encrypted soundwave or audio stream to the tunnel speaker 110. The tunnel speaker 110, at step 503, can determine whether the audio stream is encrypted based upon header data embedded within the encrypted audio stream. If the audio stream is determined to be encrypted, the process can proceed to step 505. If not, the process can proceed to step 507.

At step 505, the tunnel speaker 110 can decrypt encrypted audio with the client private key 140 obtained from the client application 156. Again, the encrypted audio can correspond to a voice-based response to a query from a user that was encrypted by the assistant connection service 116. The encrypted audio can be encrypted by the assistant connection service 116 using a client public key 139 that corresponds to the client private key 140.

Next, at step 507, the tunnel speaker 110 can play back the unencrypted audio. The unencrypted audio can either comprise audio that was decrypted at step 505 or determined to be unencrypted at step 503. Thereafter, the process can proceed to completion.

Figure 6:
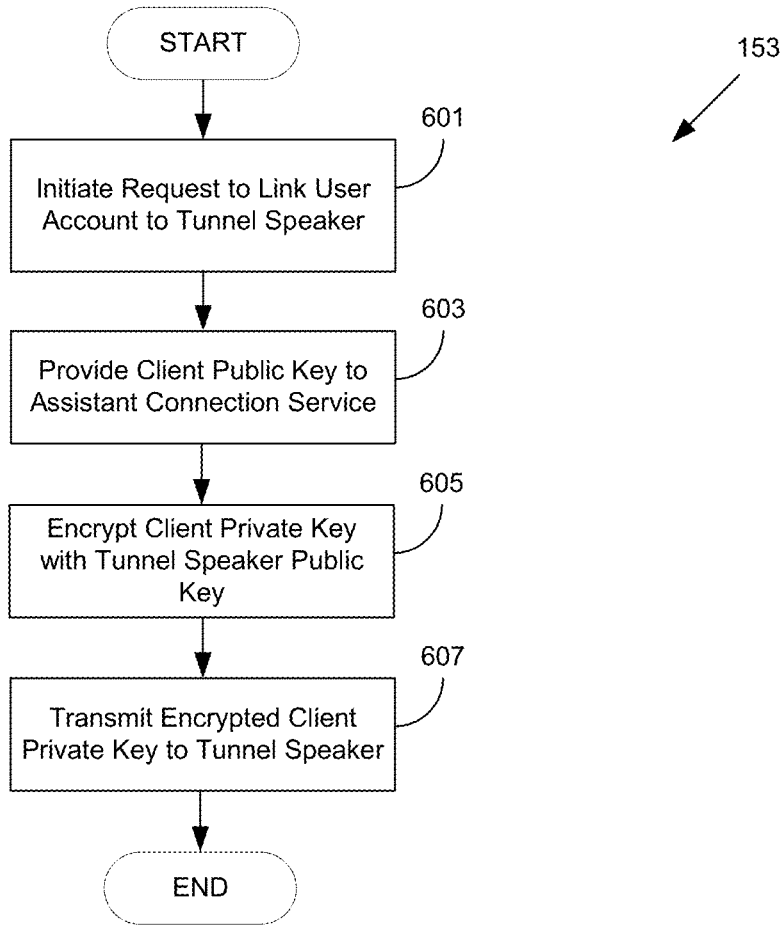
FIG. 6 is a flow chart depicting the operation of an example of a component of the network environment of FIG. 1.

FIG. 6 is another flowchart depicting an example of the operation of a portion of the client application 153. It is understood that the flowchart of FIG. 6 provides merely an example of the many different types of functional arrangements that can be employed to implement the portion of the client application 153 as described herein. As an alternative, the flowchart of FIG. 6 can be viewed as depicting an example of elements of a method implemented by the client application 153 in some implementations. The flowchart of FIG. 6 illustrates how the client application 153 can perform the key exchange process with the tunnel speaker 110.

Beginning at step 601, the tunnel speaker 110 can initiate or receive a request to link a user account 129 with the tunnel speaker 110. The request can be sent over a network interface such as a Bluetooth interface of the client device 106. The request can be considered a request to pair the tunnel speaker 110 with the user account 129 or a client device 106 associated with the user account 129. However, the tunnel speaker 110 is not paired with the client device 106 in the sense that the tunnel speaker 110 acts as a Bluetooth speaker for audio playback from the client device 106 because the tunnel speaker 110 is paired with the voice assistant device 107 for audio playback. Instead, the pairing process performs a key exchange process in which the client application 156 can provide a client private key 140 to the tunnel speaker 110.

At step 603, the client application 153 can provide the client public key 139 from an asymmetric key pair with a corresponding private key 140 to the assistant connection service 116. The client public key 139 can be used to generated encrypted responses to queries sent from the voice assistant device 107 to the assistant connection service 116.

At step 605, the client application 153 can encrypt the client private key 140 using the tunnel speaker public key obtained from the tunnel speaker 110. Again, the tunnel speaker public key can represent a public key from an asymmetric key pair that is different from the client public key 139 and client private key 140. A corresponding tunnel private key can be stored within the tunnel speaker 110 and used for the purpose of securing the key exchange between the tunnel speaker 110 and client application 156. The tunnel speaker public key provided by the tunnel speaker 110 to the client application 156 can be used by the client application 156 to encrypt the client private key 140 provided by the client application 156 to the tunnel speaker 110.

At step 607, the client application 153 can transmit the client private key 140 to the tunnel speaker 110. The transmission can occur over the Bluetooth interface of the client device 106. The tunnel speaker 110 can decrypt the encrypted client private key 140 using the tunnel speaker private key that corresponds to the tunnel speaker public key used to encrypt the client private key 140. Thereafter, the process can proceed to completion.

Figure 7:
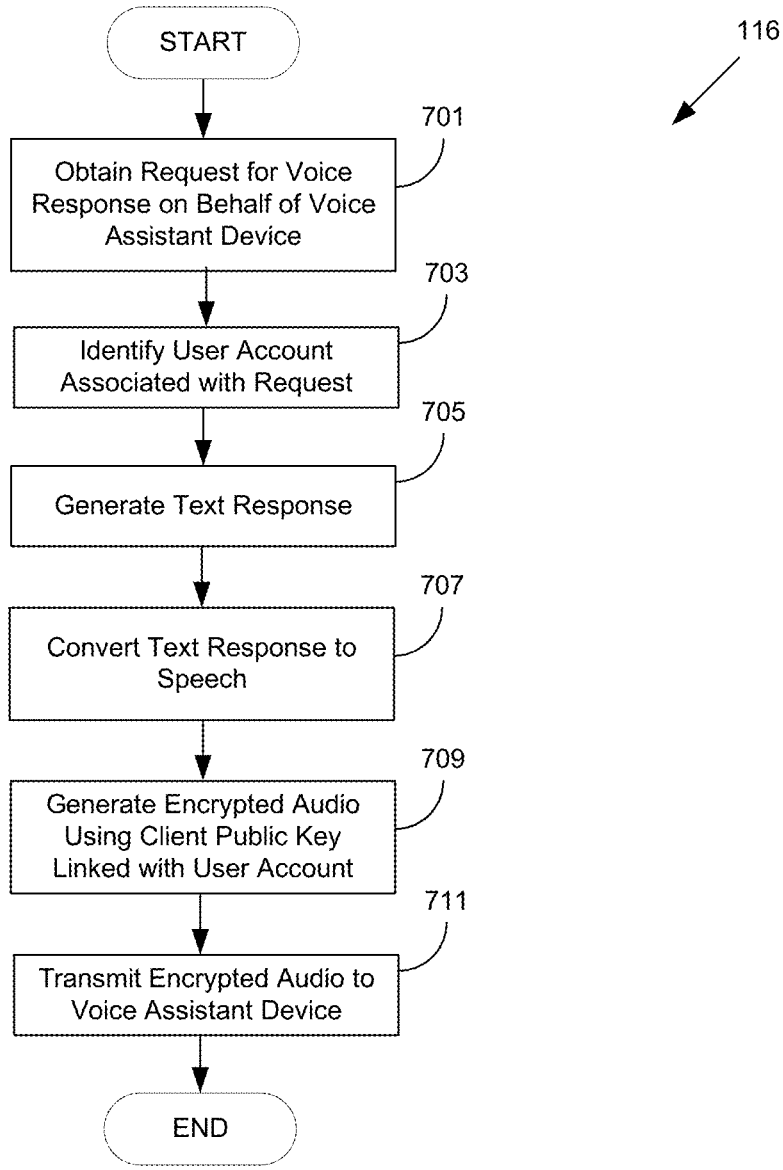
FIG. 7 is a flow chart depicting the operation of an example of a component of the network environment of FIG. 1.

FIG. 7 is another flowchart depicting an example of the operation of a portion of the assistant connection service 116. It is understood that the flowchart of FIG. 7 provides merely an example of the many different types of functional arrangements that can be employed to implement the portion of the assistant connection service 116 as described herein. As an alternative, the flowchart of FIG. 7 can be viewed as depicting an example of elements of a method implemented by the assistant connection service 116 in some implementations. The flowchart of FIG. 7 illustrates how the assistant connection service 116 can provide encrypted audio to the voice assistant device 107.

Beginning at step 701, the assistant connection service 116 can obtain a request to obtain data associated with a user account 129 on behalf of a voice assistant device 107. The request can be received by or on behalf of the voice assistant device 107. The request can include a device identifier of the voice assistant device 107.

At step 703, the assistant connection service 116 can identify a user account 129 associated with the request. The user account 129 can be identified based upon the device identifier in the request and whether a voice assistant association 140 corresponding to the device identifier is also associated with a user account 129. By identifying the user account 129, the assistant connection service 116 can also identify a client public key 140 associated with the user account 140, which can be used to encrypt a voice-based response to the request.

At step 705, the assistant connection service 116 can generate a text based response to the request. The assistant connection service 116 can identify the requested data from a particular federated service 111 associated with the user account 129 and format a text response that can be converted to speech.

At step 707, the assistant connection service 116 can convert the text response to a speech based response using a text-to-speech engine or library. The speech response can be responsive to the user's query that was embedded in the request received at step 701.

At step 709, the assistant connection service 116 can encrypt the speed based response using the client public key 140 corresponding to the user account 129 and/or the particular device identifier received in the request at step 701. The speech based response can be performed using steganography.

At step 711, the assistant connection service 116 can transmit the encrypted audio to the voice assistant device 107, which can subsequently provide the encrypted audio to the tunnel speaker 110. Thereafter, the process can proceed to completion.

The flowcharts of FIGS. 4-7 show examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts of FIGS. 4-7 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

Therefore, the following is claimed:

1. A tunnel speaker for securing audio playback through a voice assistant device, comprising:
    at least one processor;
    a network interface for communicating with a client device;
    at least one speaker configured to play back audio received from a voice assistant device having an integrated speaker, wherein the tunnel speaker is paired with the voice assistant device via a Bluetooth connection;

a storage system; and a tunnel speaker application that, when executed by the at least one processor, causes the tunnel speaker to:

receive a request to link the tunnel speaker with a user account associated with the client device;

obtain a client private key from the client device, the client private key corresponding to a client public key, wherein the client device provides the client public key to a remotely executed assistant connection service that generates encrypted audio using the client public key;

store the client private key into an encrypted storage resource within the storage system without providing the client private key to the voice assistant device;

obtain encrypted audio from the voice assistant device with which the tunnel speaker is paired;

decrypt the encrypted audio using the client private key, wherein the voice assistant device is unable to decrypt the encrypted audio; and causing the decrypted audio to be played back using the at least one speaker.

2. The system of claim 1, wherein the tunnel speaker is paired to the voice assistant device as a peripheral speaker through which audio received by the voice assistant device is played, wherein the tunnel speaker is configured to play back encrypted audio and unencrypted audio on behalf of the voice assistant device.

3. The system of claim 1, wherein the network interface for communicating with the client device further comprises a Bluetooth interface.

4. The tunnel speaker of claim 1, wherein the instructions, when executed by the at least one processor, cause the tunnel speaker to obtain the client private key from the client device by further causing the tunnel speaker to at least:

send a tunnel speaker public key to the client device in response to the request to link with the client device, the tunnel speaker public key corresponding to a tunnel speaker private key stored in the storage system;

obtain an encrypted client private key that is encrypted using the tunnel speaker public key; and decrypt the client private key using the tunnel speaker private key.

5. The tunnel speaker of claim 1, wherein the instructions, when executed by the at least one processor, cause the tunnel speaker to at least:

detect the encrypted audio from the voice assistant device based upon a header associated with the encrypted audio.

6. The system of claim 1, wherein the encrypted audio corresponds to enterprise data associated with a user account linked to the user account that is obtained by the assistant connection service on behalf of the user account.

7. The tunnel speaker of claim 1, wherein the instructions, when executed by the at least one processor, cause the computing device to at least:

receive a command to terminate the link between the user account and the tunnel speaker; and delete the client private key in response to receiving the command to terminate the link.

8. A non-transitory computer-readable medium comprising machine-readable instructions, wherein the instructions, when executed by at least one processor, cause a tunnel speaker to:

receive a request to link the tunnel speaker with a user account associated with the client device, the tunnel speaker paired with a voice assistant device having an integrated speaker via a Bluetooth connection;

obtain a client private key from the client device, the client private key corresponding to a client public key, wherein the client device provides the client public key to a remotely executed assistant connection service that generates encrypted audio using the client public key;

store the client private key into an encrypted storage resource within the storage system without providing the client private key to the voice assistant device;

obtain encrypted audio from the voice assistant device with which the tunnel speaker is paired;

decrypt the encrypted audio using the client private key, wherein the voice assistant device is unable to decrypt the encrypted audio; and causing the decrypted audio to be played back using the at least one speaker.

9. The non-transitory computer-readable medium of claim 8, wherein the tunnel speaker is paired to the voice assistant device as a peripheral speaker through which audio received by the voice assistant device is played, wherein the tunnel speaker is configured to play back encrypted audio and unencrypted audio on behalf of the voice assistant device.

10. The non-transitory computer-readable medium of claim 8, wherein the network interface for communicating with the client device further comprises a Bluetooth interface.

11. The non-transitory computer-readable medium of claim 8, wherein the instructions, when executed by the at least one processor, cause the tunnel speaker to at least:

send a tunnel speaker public key to the client device in response to the request to link with the client device, the tunnel speaker public key corresponding to a tunnel speaker private key stored in the storage system;

obtain an encrypted client private key that is encrypted using the tunnel speaker public key; and decrypt the client private key using the tunnel speaker private key.

12. The non-transitory computer-readable medium of claim 8, wherein the instructions, when executed by the at least one processor, cause the tunnel speaker to at least:

detect the encrypted audio from the voice assistant device based upon a header associated with the encrypted audio.

13. The non-transitory computer-readable medium of claim 8, wherein the encrypted audio corresponds to enterprise data associated with a user account linked to the user account that is obtained by the assistant connection service on behalf of the user account.

14. The non-transitory computer-readable medium of claim 8, wherein the instructions, when executed by the at least one processor, cause the tunnel speaker to at least:

receive a command to terminate the link between the user account and the tunnel speaker; and delete the client private key in response to receiving the command to terminate the link.

15. A method comprising:

receiving a request to link a tunnel speaker with a user account associated with the client device, the tunnel speaker paired with a voice assistant device having an integrated speaker via a Bluetooth connection;

obtaining a client private key from the client device, the client private key corresponding to a client public key, wherein the client device provides the client public key to a remotely executed assistant connection service that generates encrypted audio using the client public key;

storing the client private key into an encrypted storage resource within the storage system without providing the client private key to the voice assistant device;

obtaining encrypted audio from the voice assistant device with which the tunnel speaker is paired;

decrypting the encrypted audio using the client private key, wherein the voice assistant device is unable to decrypt the encrypted audio; and causing the decrypted audio to be played back using the at least one speaker.

16. The method of claim 15, wherein the tunnel speaker is paired to the voice assistant device as a peripheral speaker through which audio received by the voice assistant device is played, wherein the tunnel speaker is configured to play back encrypted audio and unencrypted audio on behalf of the voice assistant device.

17. The method of claim 15, further comprising:

sending a tunnel speaker public key to the client device in response to the request to link with the client device, the tunnel speaker public key corresponding to a tunnel speaker private key stored in the storage system;

obtaining an encrypted client private key that is encrypted using the tunnel speaker public key; and decrypting the client private key using the tunnel speaker private key.

18. The method of claim 15, further comprising detecting the encrypted audio from the voice assistant device based upon a header associated with the encrypted audio.

19. The method of claim 15, wherein the encrypted audio corresponds to enterprise data associated with a user account linked to the user account that is obtained by the assistant connection service on behalf of the user account.

20. The method of claim 15, further comprising:

receive a command to terminate the link between the user account and the tunnel speaker; and delete the client private key in response to receiving the command to terminate the link.

* * * * *